US012367376B2

(12) United States Patent  
Kumar et al.

(10) Patent No.: US 12,367,376 B2  
(45) Date of Patent: Jul. 22, 2025

(54) SYSTEM AND METHOD FOR TRAINING A SELF-SUPERVISED EGO VEHICLE

(71) Applicant: Ridecell, Inc., San Francisco, CA (US)

(72) Inventors: Arun Kumar Chockalingam Santha Kumar, Milpitas, CA (US); Paridhi Singh, San Jose, CA (US); Gaurav Singh, San Jose, CA (US)

(*) Notice: Subject to any disclaimer, the term of this patent is extended or adjusted under 35 U.S.C. 154(b) by 337 days.

(21) Appl. No.: 17/882,286

(22) Filed: Aug. 5, 2022

(65) Prior Publication Data

US 2023/0042750 A1 Feb. 9, 2023

Related U.S. Application Data

(60) Provisional application No. 63/230,314, filed on Aug. 6, 2021.

(51) Int. Cl.
| | |
|---|---|
| *G06N 3/04* | (2023.01) |
| *G06N 3/045* | (2023.01) |
| *G06T 7/50* | (2017.01) |
| *G06T 7/70* | (2017.01) |

(52) U.S. Cl.  
CPC .............. *G06N 3/045* (2023.01); *G06T 7/50* (2017.01); *G06T 7/70* (2017.01)

(58) Field of Classification Search  
CPC ...... G06N 3/045; G06N 3/0464; G06N 3/084; G06N 3/096; G06N 3/0895; G06T 7/50;  
(Continued)

(56) References Cited

U.S. PATENT DOCUMENTS 10,748,247 B2 8/2020 Paluri  
11,238,604 B1 * 2/2022 Baig ...................... G06N 20/00  
(Continued)

FOREIGN PATENT DOCUMENTS

CN 111626220 A 9/2020  
WO WO 2023/014998 A1 2/2023

OTHER PUBLICATIONS

PCT Application Serial No. PCT/US22/39619, International Search Report and Written Opinion dated Nov. 2, 2022.  
(Continued)

*Primary Examiner* — Iriana Cruz  
(74) *Attorney, Agent, or Firm* — Larry E. Henneman, Jr.; Henneman & Associates, PLC

(57) ABSTRACT

A system for training a machine learning framework to estimate depths of objects captured in 2-D images includes a first trained machine learning network and a second untrained or minimally trained machine learning framework. The first trained machine learning network is configured to analyze 2-D images of target spaces including target objects and to provide output indicative of 3-D positions of the target objects in the target spaces. The second machine learning network can be configured to provide an output responsive to receiving a 2-D input image. A comparator receives the outputs from the first and second machine learning networks based on a particular 2-D image. The comparator compares the output of the first trained machine learning network with the output of the second machine learning network. A feedback mechanism is operative to alter the second machine learning network based at least in part on the output of the comparator.

21 Claims, 11 Drawing Sheets

(58) Field of Classification Search
CPC ............. G06T 7/70; G06T 2207/20081; G06T 2207/20084
See application file for complete search history.

(56) References Cited

U.S. PATENT DOCUMENTS

| | | | |
|---|---|---|---|
| 2018/0268601 A1* | 9/2018 | Rad | G06V 20/647 |
| 2018/0365888 A1* | 12/2018 | Satzoda | G05D 1/0251 |
| 2020/0218979 A1* | 7/2020 | Kwon | G06F 18/2155 |

OTHER PUBLICATIONS

Deldjoo et al., "Towards real-time monocular depth estimation for mobile systems", Proceedings of the SPIE, SPIE, US, Jun. 20, 2021, (Jun. 20, 2021), pp. 117850J-117850J, vol. 11785.

Godard et al., "Digging Into Self-Supervised Monocular Depth Estimation", 2019 IEEE/CVF International Conference On Computer Vision (ICCV), IEEE, Oct. 27, 2019 (Oct. 27, 2019), pp. 3827-3837.

Liu et al., "Structured Knowledge Distillation for Dense Prediction", Arxiv.Org, Cornell University Library, 201 Olin Library Cornell University Ithaca, NY 14853, Mar. 11, 2019 (Mar. 11, 2019).

Wang et al., "Knowledge Distillation for Fast and Accurate Monocular Depth Estimation on Mobile Devices", 2021 IEEE/CVF Conference On Computer Vision and Pattern Recognition Workshops (CVPRW), IEEE, Jun. 19, 2021, (Jun. 19, 2021), pp. 2457-2465.

EP Application No. 22853975.5, Extended European Search Report dated May 19, 2025.

* cited by examiner

SYSTEM AND METHOD FOR TRAINING A SELF-SUPERVISED EGO VEHICLE

RELATED APPLICATIONS

This application claims priority to U.S. Provisional Application No. 63/230,314 filed on Aug. 6, 2021 by at least one common inventor and entitled "System And Method For Training A Self-Supervised Ego Vehicle", which is incorporated herein by reference in its entirety.

BACKGROUND OF THE INVENTION

Field of the Invention

This invention relates generally to computer vision for, for example, autonomous vehicles, and more particularly to systems and methods for providing simulated depth perception to vehicles with two-dimensional cameras.

Description of the Background Art

Depth prediction, the process of learning to regress the 3D shape of the scene using on or more camera images, is one of the most fundamental problems of computer vision. An accurate 3D understanding of the scene is critical for autonomous navigation, which enables the system to effectively navigate through the real world.

Monocular depth prediction involves the problem of regressing or estimating pixel-wise depth values using camera images, from a single view. Applications that use monocular depth prediction in computer vision are wide ranging and include, for example, SLAM (Simultaneous Localization and Mapping), 3D Scene understanding, driveable/free space estimation for Autonomous driving, and so on. Another approach for estimating depth is to use stereo cameras, which are oftentimes more accurate than monocular cameras. However, the stereo rig, especially with a wide baseline, is extremely challenging to set up and calibrate for real world autonomous navigation systems, and often requires continuous auto-calibration which is computationally expensive, and incurs very high maintenance costs over time.

Monocular depth prediction algorithms are classified based on their nature of training into two major subclasses; fully supervised or self-supervised methods. Fully-supervised learning-based methods, as the name suggests, rely directly on ground truth supervision with Lidar data being the most common form of ground truth, whereas the self-supervised methods use temporal image sequences (frames of a video) to learn to predict depth by minimizing image consistency error between temporal image frames. While the depth-prediction performances of self-supervised methods are at times comparable to their supervised counterparts, due to the nature of the loss function used in the regression, the self-supervised methods are not capable of learning the actual scale of the scene.

In other words, self-supervised methods often rely on temporal image consistency (e.g., uses motion of the ego vehicles) to triangulate and learn to regress the scene's depth. A camera image is a 2D projection of the 3D world, and has lost all the 3D information of the scene when it is projected into the 2D image frame. Since, the self-supervised methods use camera image alone to learn to predict a scene's depth, the predicted depth (3D) lies on an arbitrary scale. Thus, in order to approximate the actual scale of the scene, these methods either need active sensors mounted on the ego vehicles at the test time, for example radar or lidar sensors to infuse the scale of the scene into the system, or a wide baseline stereo camera setup, both of which defeat the purpose of having a "self-supervised" and "monocular" depth prediction architecture in the first place.

While fully-supervised networks trained using lidar data supervision would work reasonably well at test time without the need for LiDAR sensors mounted on the ego vehicle, they also require the camera setup to be almost exactly the same, including the camera intrinsics, fields-of-view, camera placement, etc., for optimal performance. For instance, the supervised methods trained using Lidar and cameras mounted on top, may work well given the same camera setup, but will fail to predict depth on dashcam images, or when the camera placement changes, or when the camera has a different field of view or focal length, and so on.

Traditionally, the problem of domain adaptation is tackled by fine-tuning the pre-trained network on the data from the new setup, but that would require the client to have a lidar sensor, which defeats the purpose of the camera-only depth prediction during inference in the first place.

SUMMARY

The present invention overcomes the problems associated with the prior art by providing a system and method for training self-supervised ego vehicles. The invention facilitates improved depth prediction in vehicles without LiDAR (or any other type of ground truth sensors) including, but not limited to, single-camera vehicles.

An example method for training a machine learning framework to estimate the depths of objects captured in a two-dimensional image is disclosed. The example method includes providing a first trained machine learning network and a second untrained or minimally trained machine learning network. The first trained machine learning network is trained to and capable of determining three-dimensional (3-D) positions of target objects represented in two-dimensional (2-D) images of target spaces including the target objects. The second machine learning network can be configured to provide an output responsive to receiving an input image. The example method further includes acquiring a 2-D image of objects in a space. The 2-D image can include 2-D representations of the objects in the space. The 2-D image is provided to the first trained machine learning network to generate an estimate of depths of the objects in the space. The 2-D image is also provided to the second machine learning network to generate an output corresponding to the 2-D image. The example method additionally includes comparing the estimate of the depths of the objects in the space with the output corresponding to the 2-D image, and altering the second machine learning network based at least in part on the comparison.

In a particular example method, the step of comparing can include generating a loss function indicative of differences between the estimate of depths of the objects in the space and the output. The loss function can be a function of at least a portion of the second machine learning network. The step of altering the second machine learning network can include altering the second machine learning network to minimize the loss function. The second machine learning network can include a plurality of nodes, and the loss function can be based at least in part on values associated with the nodes. The step of altering the second machine learning network can include altering the values associated with the nodes. The step of altering the values associated with the nodes can include calculating a contribution of each of the nodes to the loss function and can additionally include altering the values associated with each of the nodes in order to minimize the calculated contribution to the loss function.

In an example method, the estimate of the depths of the objects in the space can include information indicative of scale. The output of the second machine learning network corresponding to the 2-D image can be a second estimate of the depths of the objects in the space that includes initially inaccurate information indicative of the scale (e.g., an initialized variable, a random value, etc.). The loss function can be at least partially indicative of a loss of the information indicative of the scale between the estimate and the second estimate.

An example method further includes providing a third machine learning network configured to provide a second output responsive to receiving the input image. The 2-D image can be provided to the third machine learning network to generate a second output corresponding to the 2-D image. The method can additionally include comparing the output corresponding to the 2-D image with the second output corresponding to the 2-D image to generate a second comparison. The error function can be based at least in part on the second comparison.

In an example method, the first machine learning network can be pre-trained utilizing images from a first camera setup, and the third machine learning network can be pre-trained utilizing images from a second camera setup. The second camera setup can be different from the first camera setup. The 2-D image can be captured from the second camera setup.

In an example method, the first camera setup can be on a vehicle equipped with a ground truth sensor (e.g., LiDAR or some other 3-D sensor). The second camera setup can be on a vehicle that is not equipped with a ground truth sensor. The first machine learning network can be pre-trained utilizing the images of scenes from the first camera setup in combination with time-synchronized position information of the scenes captured by the ground truth sensor.

Example systems for training a machine learning framework to estimate the depths of objects captured in a two-dimensional image are also disclosed. An example system includes at least one hardware processor electrically coupled to execute code. The code can include a set of native instructions that cause the hardware processor to perform a corresponding set of operations responsive to executing the set of native instructions. The system additionally includes memory for storing data and the code. The data and code can include a first trained machine learning network capable of determining three-dimensional (3-D) positions of target objects represented in two-dimensional (2-D) images of target spaces including the target objects. The data and code can also include a second machine learning network. The second machine learning network can be configured to provide an output responsive to receiving an input image. The data can include a 2-D image of objects in a space. The 2-D image can include 2-D representations of the objects in the space. The code can include a first subset of the set of native instructions configured to provide the 2-D image to the first trained machine learning network to generate an estimate of depths of the objects in the space. The code can also include a second subset of the set of native instructions configured to provide the 2-D image to the second machine learning network to generate an output corresponding to the 2-D image. A third subset of the set of native instructions can be configured to compare the estimate of the depths of the objects in the space with the output corresponding to the 2-D image. A fourth subset of the set of native instructions can be configured to alter the second machine learning network based at least in part on the comparison.

In the example system, the third subset of the set of native instructions can be additionally configured to generate a loss function indicative of differences between the estimate of depths of the objects in the space and the output of the second machine learning network. The loss function can be a function of at least a portion of the second machine learning network. The fourth subset of the set of native instructions can be additionally configured to alter the second machine learning network to minimize the loss function.

The second machine learning network can include a plurality of nodes, and the loss function can be based at least in part on values associated with the nodes. The fourth subset of the set of native instructions can be additionally configured to alter the values associated with the nodes. The fourth subset of the set of native instructions can also be additionally configured to calculate a contribution of each of the nodes to the loss function and to alter the values associated with each of the nodes in order to minimize the calculated contribution to the loss function.

In an example system, the estimate of the depths of the objects in the space can include information indicative of scale. The output corresponding to the 2-D image can be a second estimate of the depths of the objects in the space. The second estimate can include initially inaccurate information indicative of the scale (e.g., a randomly initialized value). The loss function can be at least partially indicative of a loss of the information indicative of the scale between the estimate and the second estimate.

In an example system, the memory and the code can additionally include a third machine learning network. The third machine learning network can be configured to provide a second output responsive to receiving the input image. The code can additionally include a fifth subset of the set of native instructions which can be configured to provide the 2-D image to the third machine learning network to generate a second output corresponding to the 2-D image. In the example system, the third subset of the set of native instructions can be additionally configured to compare the output corresponding to the 2-D image with the second output corresponding to the 2-D image to generate a second comparison. The error function can be based at least in part on the second comparison.

The first machine learning network can be pre-trained utilizing images from a first camera setup. The third machine learning network can be pre-trained utilizing images from a second camera setup. The second camera setup can be different from the first camera setup. The 2-D image can be captured from the second camera setup. The first camera setup can be on a vehicle equipped with a light detecting and ranging (LiDAR) sensor, and the second camera setup can be on a vehicle that is not equipped with a LiDAR sensor. The first machine learning network can be pre-trained utilizing the images of scenes from the first camera setup in combination with time-synchronized position information captured by the LiDAR sensor and corresponding to the images.

An example system for training a machine learning framework to estimate the depths of objects captured in a two-dimensional image includes a first trained machine learning network configured to analyze two-dimensional (2-D) images of target spaces including target objects. The first trained machine learning network can be configured to provide output indicative of three-dimensional (3-D) positions of the target objects in the target spaces. The example system can additionally include a second machine learning network. The second machine learning network can be configured to provide an output responsive to receiving a 2-D input image. The example system can additionally include a comparator coupled to receive the output from the first trained machine learning network based on a particular 2-D image. The comparator can also be coupled to receive the output from the second machine learning network based on the particular 2-D image. The comparator can be operative to compare the output of the first trained machine learning network with the output of the second machine learning network. The example system can additionally include a feedback mechanism operative to alter the second machine learning network based at least in part on the output of the comparator.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing systems and methods for determining the depths of objects in a three-dimensional (3D) scene captured by a two-dimensional (2D) camera. In the following description, numerous specific details are set forth (e.g., specific hardware, algorithms, networks, etc.) in order to provide a thorough understanding of the invention. Those skilled in the art will recognize, however, that the invention may be practiced apart from these specific details. In other instances, details of well-known autonomous driving practices (e.g., routine optimization) and components have been omitted, so as not to unnecessarily obscure the present invention.

Figure 1:
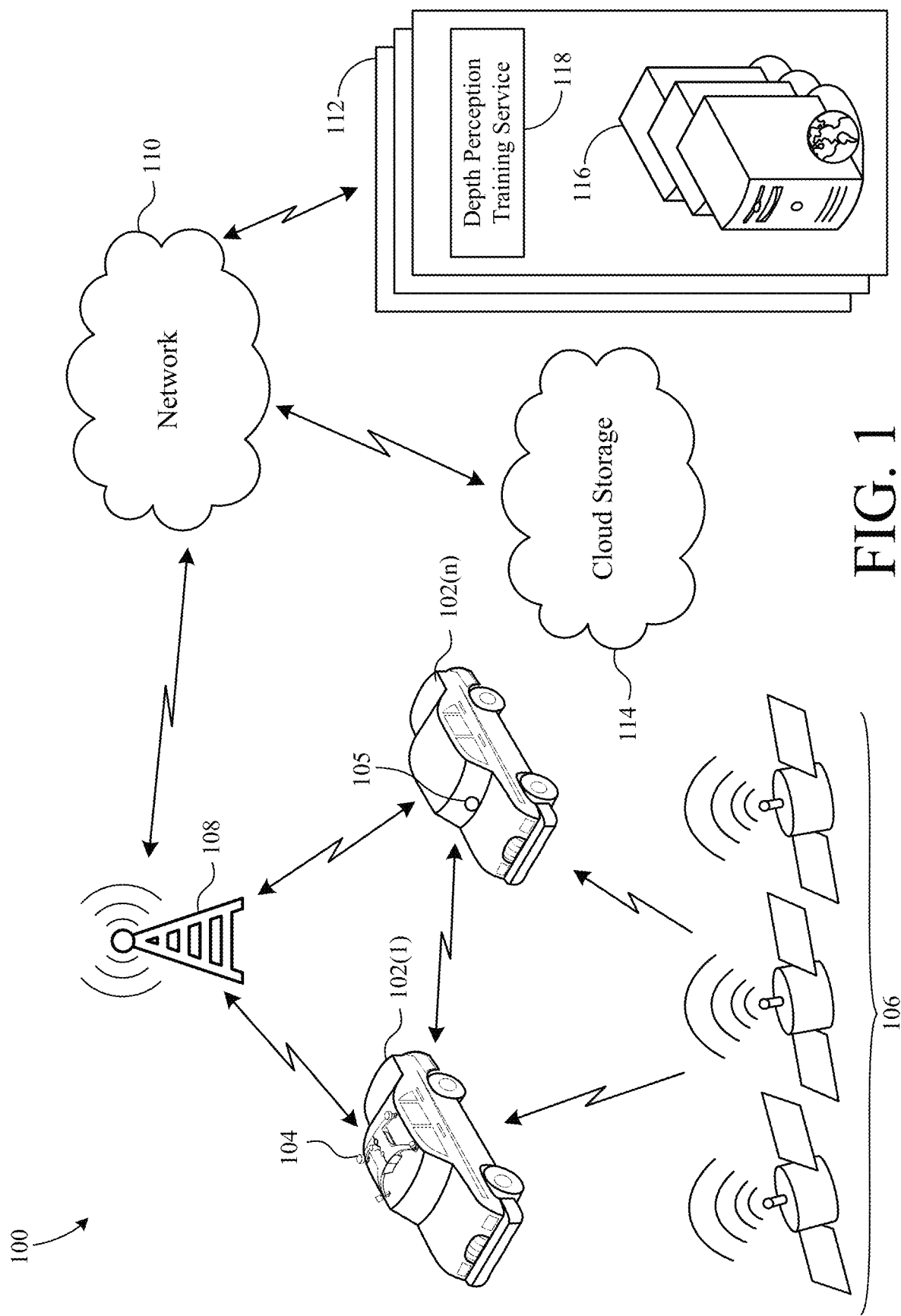
FIG. 1 is a block diagram showing an example fleet of vehicles communicating with a remote data computing system.

FIG. 1 shows an autonomous vehicle infrastructure 100, including a fleet of autonomous vehicles 102(1-$n$). In the example embodiment, the fleet of autonomous vehicles can include original equipment autonomous vehicles and/or legacy vehicles (i.e., vehicles originally intended to be piloted by a human) that are outfitted with a detachable sensor unit 104 that includes a plurality of sensors (e.g., cameras, radar, LIDAR, etc.). The sensors enable the legacy vehicle to be piloted in the same way as a contemporary autonomous vehicle, by generating and providing data indicative of the surroundings of the vehicle. More information regarding detachable sensor units can be found in U.S. patent application Ser. No. 16/830,755, filed on Mar. 26, 2020 by Anderson et al., which is incorporated herein by reference in its entirety. In addition, the fleet can include any vehicles outfitted with one or more sensors, whether or not the vehicles are capable of being piloted autonomously.

The vehicles in the fleet can be different from one another. For example, vehicle 102(1) is equipped with a robust sensor unit 104, which can include, without limitation, one or more cameras in combination with ground truth supervision sensors (e.g., lidar(s), radar, and/or any other suitable ground truth supervision). On the other hand, the scant sensor set of vehicle 102($n$) includes only a single dash cam 105.

For ease of operation, vehicles 102 should be able to identify their own locations. To that end, vehicles 102 receive signals from a plurality of global positioning system (GPS) satellites 106. The present location of the vehicle can be determined by comparing the timing of the signals received from GPS satellites 106. The determined location is utilized by vehicles 102 at least in order to determine intended routes and to navigate along the routes.

Vehicles 102 can also communicate with riders, administrators, technicians, etc. for positioning, monitoring, and/or maintenance purposes. To that end, vehicles 102 also communicate with a wireless communications tower 108 via, for example, a wireless cell modem (not shown) installed in sensor units 104 or elsewhere in vehicles 102. Vehicles 102 may communicate (via wireless communications tower 108) sensor data, location data, diagnostic data, etc. to relevant entities interconnected via an network 110 (e.g., the Internet). The relevant entities can include one or more data center(s) 112 and a cloud storage provider 114. Communication between vehicles 102 and data center(s) 112 facilitate monitoring and piloting autonomous vehicles 102, although vehicles 102 are capable of autonomous travel without an active network connection. Cloud storage provider 114 provides storage for data generated by the various sensors of vehicles 102, the data being potentially useful for modeling and/or other purposes. Alternatively, the data can be provided directly to and stored at data centers 112.

Data center(s) 112 include(s) servers 116 utilized for communicating with vehicles 102. Servers 116 also include (or are at least connected to) at least one depth perception training service 118. Depth perception training service 118 utilizes data stored in servers 116, cloud storage 114, and/or streamed directly from vehicles 102 to generate improved models for depth perception in autonomous vehicles 102. In an example embodiment, video and Lidar data is initially received from autonomous vehicles such as vehicle 102(1) having both cameras and Lidar sensors (i.e. supervised vehicles). Depth perception models are then generated using the received data and provided to vehicles such as vehicle 102($n$) having only a camera (i.e. self-supervised student vehicles) to facilitate improved depth perception in those vehicles. Optionally, additional video data from the self-supervised student vehicles can be received and utilized to improve the models. As a more particular example, video data received from a particular self-supervised vehicle can be utilized in combination with a fully trained supervised network to "fine-tune" (i.e., further train) the depth perception model utilized by that particular vehicle. Depth perception training service 118 and the resulting models will be discussed in further detail below.

Figure 2:
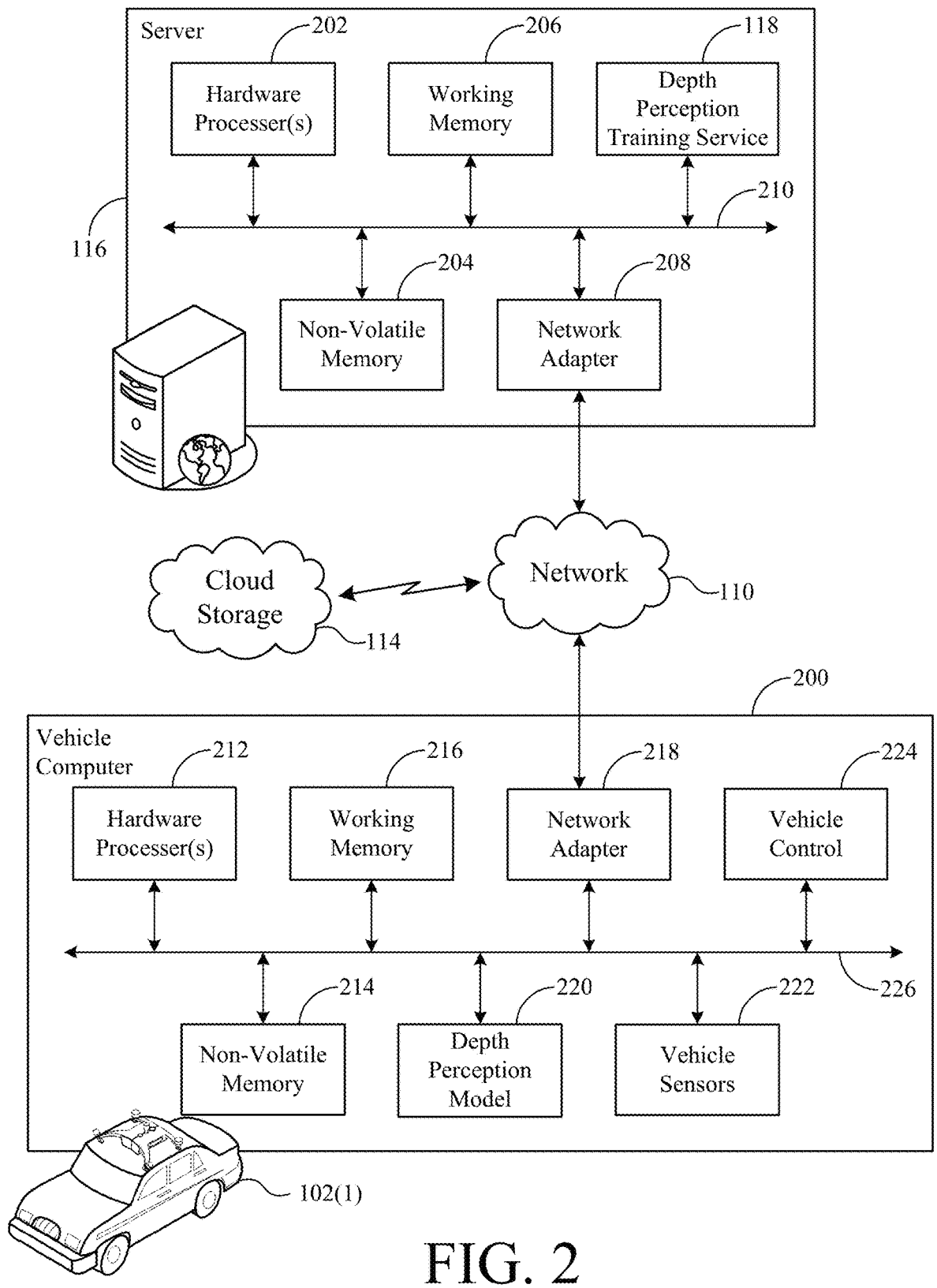
FIG. 2 is a block diagram showing one of the vehicles and one of the servers of FIG. 1 in additional detail.

FIG. 2 is a block diagram showing an example one of servers 116 and a vehicle computer 200 in greater detail. Server 116 includes at least one hardware processor 202, non-volatile memory 204, working memory 206, a network adapter 208, and depth perception training service 118, all interconnected and communicating via a system bus 210. Hardware processor 202 imparts functionality to server 116 by executing code stored in any or all of non-volatile memory 204, working memory 206, and depth perception training service 118. Hardware processor 202 is electrically coupled to execute a set of native instructions configured to cause hardware processor 202 to perform a corresponding set of operations when executed. In the example embodiment, the native instructions are embodied in machine code that can be read directly by hardware processor 202. Software and/or firmware utilized by server 116 include(s) various subsets of the native instructions configured to perform specific tasks related to the functionality of server 116. Developers of the software and firmware write code in a human-readable format, which is translated into a machine-readable format (e.g., machine code) by a suitable compiler.

Non-volatile memory 204 stores long term data and code including, but not limited to, software, files, databases, applications, etc. Non-volatile memory 204 can include several different storage devices and types, including, but not limited to, hard disk drives, solid state drives, read-only memory (ROM), network attached storage devices, etc., distributed across data center 112. Hardware processor 202 transfers code from non-volatile memory 204 into working memory 206 and executes the code to impart functionality to various components of server 116. For example, working memory 206 stores code, such as software modules, that when executed provides the described functionality of server 116. Working memory 206 can include several different storage devices and types, including, but not limited to, random-access memory (RAM), non-volatile RAM, flash memory, etc. Network adapter 208 provides server 116 with access (either directly or via a local network) to network 110. Network adapter 208 allows server 116 to communicate with cloud storage 114, vehicles 102, and sensor units 104 (via vehicle computer 200), and others.

Depth perception training service 118 includes software, hardware, and/or firmware configured for generating, training, and/or running models for estimating three-dimensional (3D) positions of objects captured by vehicle cameras. Service 118 utilizes processing power, data, storage, etc. from hardware processor 202, non-volatile memory 204, working memory 206, and network adapter 208 to facilitate the functionality of service 118. For example, service 118 may access image data stored in non-volatile memory 204 in order to train a model from the data. Service 118 may then store data corresponding to the trained model back in non-volatile memory 204 in a separate format, separate location, separate directory, etc.

Depth perception training service 118 obtains Lidar and video/image data, which it utilizes to generate and/or train depth perception models for use in autonomous vehicles 102. The generated models can be adapted to vehicles with only a 2D camera and no Lidar sensors. The models allow the self-supervised student vehicles to better estimate the depths of objects in scenes captured by the camera. This functionality allows the self-supervised student vehicles to determine the three-dimensional locations of objects surrounding the vehicle, including road signs, stop lights, pedestrians, etc. The ability to determine the three-dimensional locations of such objects around a vehicle is important for autonomously piloting a vehicle safely and efficiently. Therefore, depth perception training service 118 facilitates improved autonomous driving in self-supervised student vehicles (i.e. those without Lidar sensors). The details of depth perception training service 118 will be discussed in greater detail below.

Vehicle computer 200 includes at least one hardware processor 212, non-volatile memory 214, working memory 216, a network adapter 218, a depth perception model 220, vehicle sensors 222, and vehicle controls 224, all interconnected and communicating via a system bus 226. Hardware processor 212 imparts functionality to computer 200 by executing code stored in any or all of non-volatile memory 214, working memory 216, and depth perception model 220. Hardware processor 212 is electrically coupled to execute a set of native instructions configured to cause hardware processor 212 to perform a corresponding set of operations when executed. In the example embodiment, the native instructions are embodied in machine code that can be read directly by hardware processor 212. Software and/or firmware utilized by computer 200 include(s) various subsets of the native instructions configured to perform specific tasks related to the functionality of vehicle computer 200. Developers of the software and firmware write code in a human-readable format, which is translated into a machine-readable format (e.g., machine code) by a suitable compiler.

Non-volatile memory 214 stores long term data and code including, but not limited to, software, files, databases, applications, etc. Non-volatile memory 214 can include several different storage devices and types, including, but not limited to, hard disk drives, solid state drives, read-only memory (ROM), etc. Hardware processor 212 transfers code from non-volatile memory 214 into working memory 216 and executes the code to impart functionality to various components of computer 200. For example, working memory 216 stores code, such as software modules, that when executed provides the described functionality of vehicle computer 200. Working memory 216 can include several different storage devices and types, including, but not limited to, random-access memory (RAM), non-volatile RAM, flash memory, etc. Network adapter 218 provides computer 200 with access (either directly or via a local network) to network 110. Network adapter 218 allows computer 200 to communicate with cloud storage 114 (via network 110), server 116, and others.

Depth perception model 220 is received from vehicle communication server(s) 202 and is utilized by vehicle(s) 102 to determine the depths of objects captured by cameras of vehicle(s) 102. Depth perception model 220 receives video data from cameras coupled to vehicle(s) 102 and processes the video data through a machine learned network (e.g., a neural network) to determine the three-dimensional locations of objects in the scenes captured by the cameras. Depth perception model 220 allows vehicle(s) 102 to navigate as though utilizing a Lidar sensor even when vehicle(s) 102 is not using or does not have a Lidar sensor. Optionally, depth perception model 220 may be continually updated as additional data is provided to vehicle communication server(s) 202 and the model is incrementally improved by depth perception training service 118.

Vehicle sensors 222 include a variety of sensors and other instruments for determining information indicative of the state and surroundings of vehicle 102(1). Sensors 222 may include, but are not limited to, cameras, light detection and ranging (LiDAR) sensors, GPS units, accelerometers, inertial measurement units, thermometers, speedometers, or any other sensor that may provide potentially useful information regarding the state or the surroundings of vehicle 102(1). In the example embodiment, sensors 222 include cameras. These sensors provide inputs to depth perception model 220, which are utilized to estimate the depths of objects in the vicinity of vehicle 102(1) during operation.

Vehicle controls 224 include a variety of control systems for providing control instructions to various systems of vehicle 102(1). Controls 224 may include, but are not limited to, steering controls, braking controls, powertrain controls, signaling controls, or any other controls that may be useful in piloting vehicle 102(1). In the example embodiment, controls 224 include a steering control for providing control signals to the steering components of vehicle 102(1). Vehicle sensors 222 and vehicle controls 224 will be discussed in further detail with reference to FIG. 3B below.

Figures 3A, 3B:
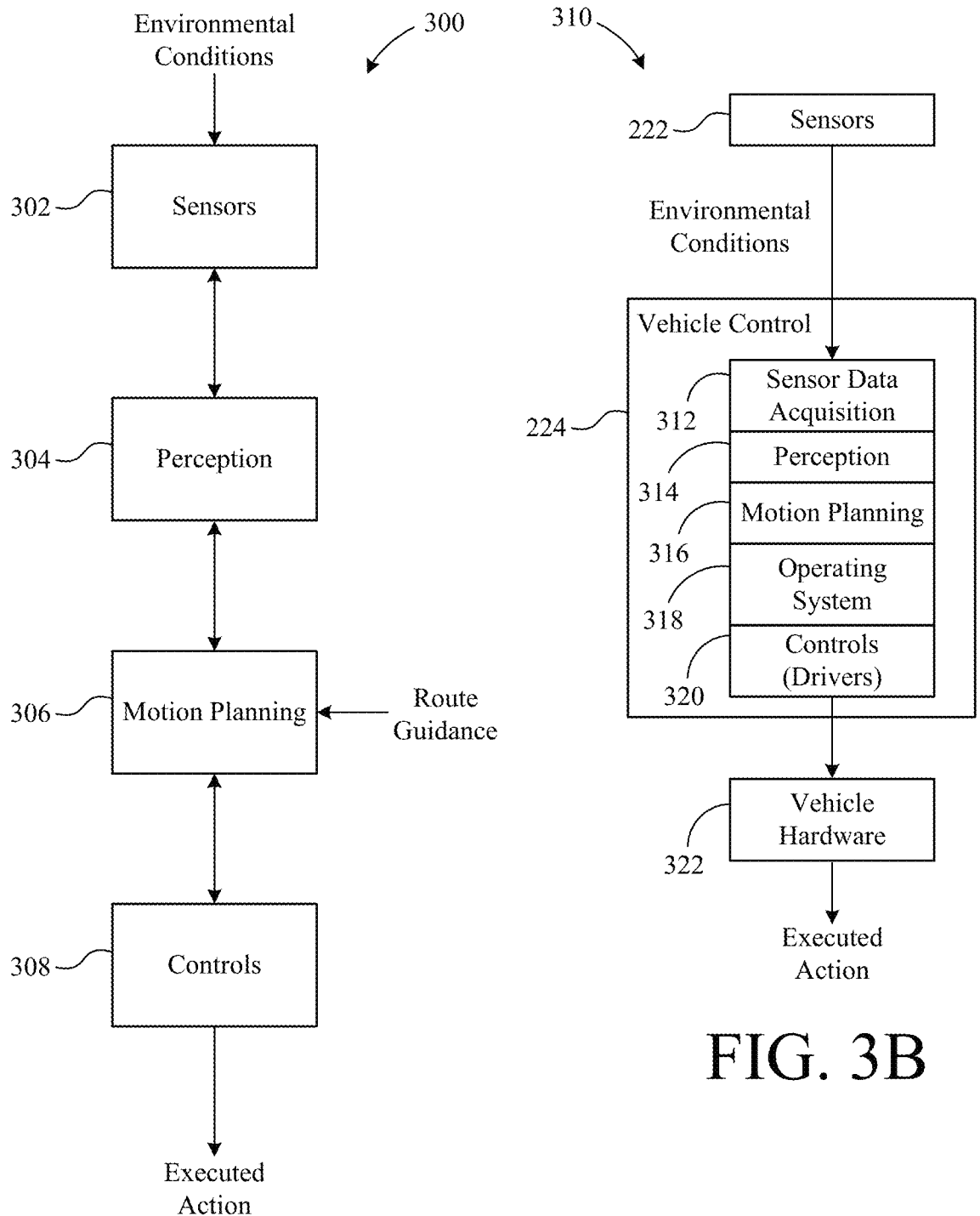
FIG. 3A is a flow chart summarizing an example method, which can be implemented by an autonomous driving stack, which is utilized to pilot the vehicles of FIG. 1.
FIG. 3B is a block diagram showing an example autonomous driving stack.

FIG. 3A is a flow chart summarizing an example method 300 of determining what commands to provide to an autonomous vehicle during operation. In a first step 302, sensors capture data representative of the environment of the vehicle. Then, in a second step 304, the sensor data is analyzed to form perceptions corresponding to the environmental conditions. Next, in a third step 306, the environmental perceptions (in conjunction with route guidance) are used to plan desirable motion. Then, in a fourth step 308, the planned motion(s) is/are used to generate control signals, which result in the desired motion.

FIG. 3B is a block diagram showing an example autonomous driving (AD) stack 310, which is utilized by autonomous vehicle 102 to determine what commands to provide to the controls of the vehicle (e.g., implementing method 300). Primarily, AD stack 310 is responsible for dynamic collision and obstacle avoidance. AD stack 310 is at least partially instantiated within vehicle computer 200 (particularly vehicle control module 224) and utilizes information that may or may not originate elsewhere. AD stack 310 receives input from sensors 234 and includes a sensor data acquisition layer 312, a perception layer 314, motion planning layer 316, an optional operating system layer 318, and a control/driver layer 320. AD stack 310 receives input from sensors 222 and provides control signals to vehicle hardware 322.

Sensors 222 gather information about the environment surrounding vehicle 102 and/or the dynamics of vehicle 102 and provide that information in the form of data to a sensor data acquisition layer 312. Sensors 222 can include, but are not limited to, cameras, LIDAR detectors, accelerometers, GPS modules, and any other suitable sensor including those yet to be invented. Perception layer 314 analyzes the sensor data to make determinations about what is happening on and in the vicinity of vehicle 102 (i.e. the "state" of vehicle 102), including localization of vehicle 102. For example, perception layer 314 can utilize data from LIDAR detectors, cameras, etc. to determine that there are people, other vehicles, sign posts, etc. in the area surrounding the vehicle, and that the vehicle is in a particular location. In an example embodiment, a vehicle 102 without a LIDAR sensor can utilize depth perception model 220 as part of perception layer 314, to make these determinations. It should be noted that there isn't necessarily a clear division between the functions of sensor data acquisition layer 312 and perception layer 314. For example, cameras of sensors 222 can record video and provide the raw data directly to perception module 304, which performs processing on the data to determine that the video captures nearby objects. Alternatively, the camera itself could perform some portion of the processing in order to lessen the burden on perception module 304.

Perception layer 314 provides information regarding the state of vehicle 102 to motion planning layer 316, which utilizes the state information along with received route guidance to generate a plan for safely maneuvering vehicle 102 along a route. Motion planning layer 316 utilizes the state information to safely plan maneuvers consistent with the route guidance. For example, if vehicle 102 is approaching an intersection at which it should turn, motion planning layer 316 may determine from the state information that vehicle 102 needs to decelerate, change lanes, and wait for a pedestrian to cross the street before completing the turn.

In the example, the received route guidance can include directions along a predetermined route, instructions to stay within a predefined distance of a particular location, instructions to stay within a predefined region, or any other suitable information to inform the maneuvering of vehicle 102. The route guidance may be received from data center 112 over a wireless data connection, input directly into the computer of vehicle 102 by a passenger, generated by the vehicle computer from predefined settings/instructions, or obtained through any other suitable process.

Motion planning layer 316 provides the motion plan, optionally through an operating system layer 318, to control/drivers layer 320, which converts the motion plan into a set of control instructions that are provided to the vehicle hardware 322 to execute the motion plan. In the above example, control layer 320 will generate instructions to the braking system of vehicle 102 to cause the deceleration, to the steering system to cause the lane change and turn, and to the throttle to cause acceleration out of the turn. The control instructions are generated based on models (e.g. depth perception model 220) that map the possible control inputs to the vehicle's systems onto the resulting dynamics. Again, in the above example, control module 308 utilizes depth perception model 220 to determine the amount of steering required to safely move vehicle 102 between lanes, around a turn, etc. Control layer 320 must also determine how inputs to one system will require changes to inputs for other systems. For example, when accelerating around a turn, the amount of steering required will be affected by the amount of acceleration applied.

Although AD stack 310 is described herein as a linear process, in which each step of the process is completed sequentially, in practice the modules of AD stack 310 are interconnected and continuously operating. For example, sensors 222 are always receiving, and sensor data acquisition layer is always processing, new information as the environment changes. Perception layer 314 is always utilizing the new information to detect object movements, new objects, new/changing road conditions, etc. The perceived changes are utilized by motion planning layer 316, optionally along with data received directly from sensors 222 and/or sensor data acquisition layer 312, to continually update the planned movement of vehicle 102. Control layer 320 constantly evaluates the planned movements and makes changes to the control instructions provided to the various systems of vehicle 102 according to the changes to the motion plan.

As an illustrative example, AD stack 310 must immediately respond to potentially dangerous circumstances, such as a person entering the roadway ahead of vehicle 102. In such a circumstance, sensors 222 would sense input from an object in the peripheral area of vehicle 102 and provide the data to sensor data acquisition layer 312. In response, perception layer 314 could determine that the object is a person traveling from the peripheral area of vehicle 102 toward the area immediately in front of vehicle 102. Motion planning layer 316 would then determine that vehicle 102 must stop in order to avoid a collision with the person. Finally, control layer 320 determines that aggressive braking is required to stop and provides control instructions to the braking system to execute the required braking. All of this must happen in relatively short periods of time in order to enable AD stack 310 to override previously planned actions in response to emergency conditions.

Figure 4:
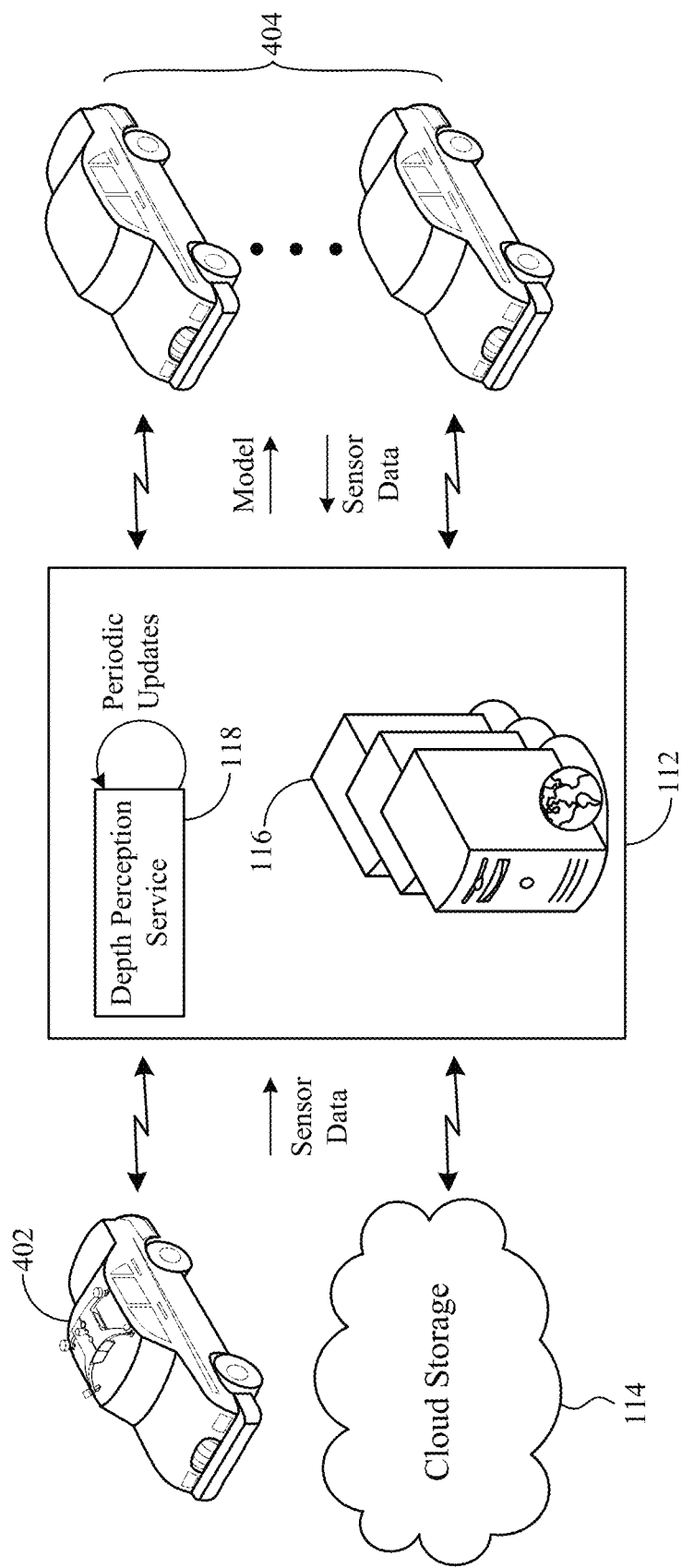
FIG. 4 is a block diagram showing an example process for training a depth perception model for use in the vehicle computer of FIG. 3.

FIG. 4 is a diagram illustrating an inventive process for generating depth perception model 220 and providing model 220 for use by autonomous vehicles 102. A teacher vehicle 402 is piloted in order to capture and provide sensor data that is utilized to generate model 220. In particular, teacher vehicle 402 is a supervised vehicle that includes a camera to capture image data and one or more LiDAR sensors (or other suitable sensors) to provide ground truth information corresponding to the captured images. The sensor data, therefore, comprises LiDAR data and corresponding video data, captured and recorded during the piloting of teacher vehicle 402. Teacher vehicle 402 provides the sensor data to servers 116 to be utilized by depth perception service 118 in the generation/training of depth prediction models. Alternatively, sensor data recorded during prior voyages of other vehicles can be stored in cloud storage 114 and retrieved by depth perception training service 118 as required. As another alternative, the sensor data could be artificially generated automatically by software algorithms or manually by data scientists. The immediate source of the sensor data can be any reliable source.

The data received from teacher vehicle 402 is utilized by depth perception service 118 to train a teacher network for depth perception with ground truth LiDAR supervision. In the example, the teacher network is a deep neural network trained using a regression algorithm. In alternative embodiments, any suitable network/algorithm can be used, including those yet to be invented.

The resulting teacher network is then utilized to train a student network. The student network is utilized to facilitate depth perception with scale on student vehicles 404 which are not equipped with LiDAR sensors. The student network is another deep neural network, which is trained to perceive scaled depth in a monocular image, using knowledge distillation from the teacher network. In particular, during training a loss function is calculated between the results of the teacher and student networks. By minimizing the loss function, knowledge of how to calculate scaled depth of a monocular image is distilled from the teacher network to the student network. The trained student network is then capable of determining scaled depth of a monocular image without being trained with ground truth depth data.

The student network can be trained utilizing camera data retrieved from student vehicles 404, in order to domain adapt the student network to work on the student data and camera configuration effortlessly even with minimal amounts of data, without losing performance of the network. Optionally, the student network can be pre-trained utilizing video data captured by teacher vehicle 402 (without the corresponding LiDAR data), before fine-tuning with the student data. The training of the teacher and student networks will be discussed in greater detail with reference to FIGS. 8A and 8B, below.

Servers 116 upload the trained student network (comprising at least a portion of model 220) to student vehicles 404. The trained student network can be uploaded to vehicles 404 via cellular networks, Bluetooth connections, flash memory, hardwired connections, or any other suitable means. Following upload, the student network is utilized to predict depth information in scenes captured by the single camera of student vehicle 404. An important advantage of the example embodiment is that it allows student vehicle 404 to determine depth information about its surroundings without the need for onboard LiDAR sensors.

As additional video data is captured by vehicles 402 and 404 and provided to servers 116, depth perception training service 118 can continually update the student network at data center 112 and periodically upload the updated network to the student vehicle 404. In particular, video data captured by a particular student vehicle 404 can be utilized to further fine-tune the student network corresponding to the particular student vehicle 404. Such fine-tuning provides improved depth perception by the particular camera configuration of the corresponding student vehicle 404. Updates to the student network can also occur as any or all of the algorithms, loss functions, and/or pre-/post-processing of the data, etc. are improved, with or without additional video data from vehicles 402 and/or 404.

Figure 5:
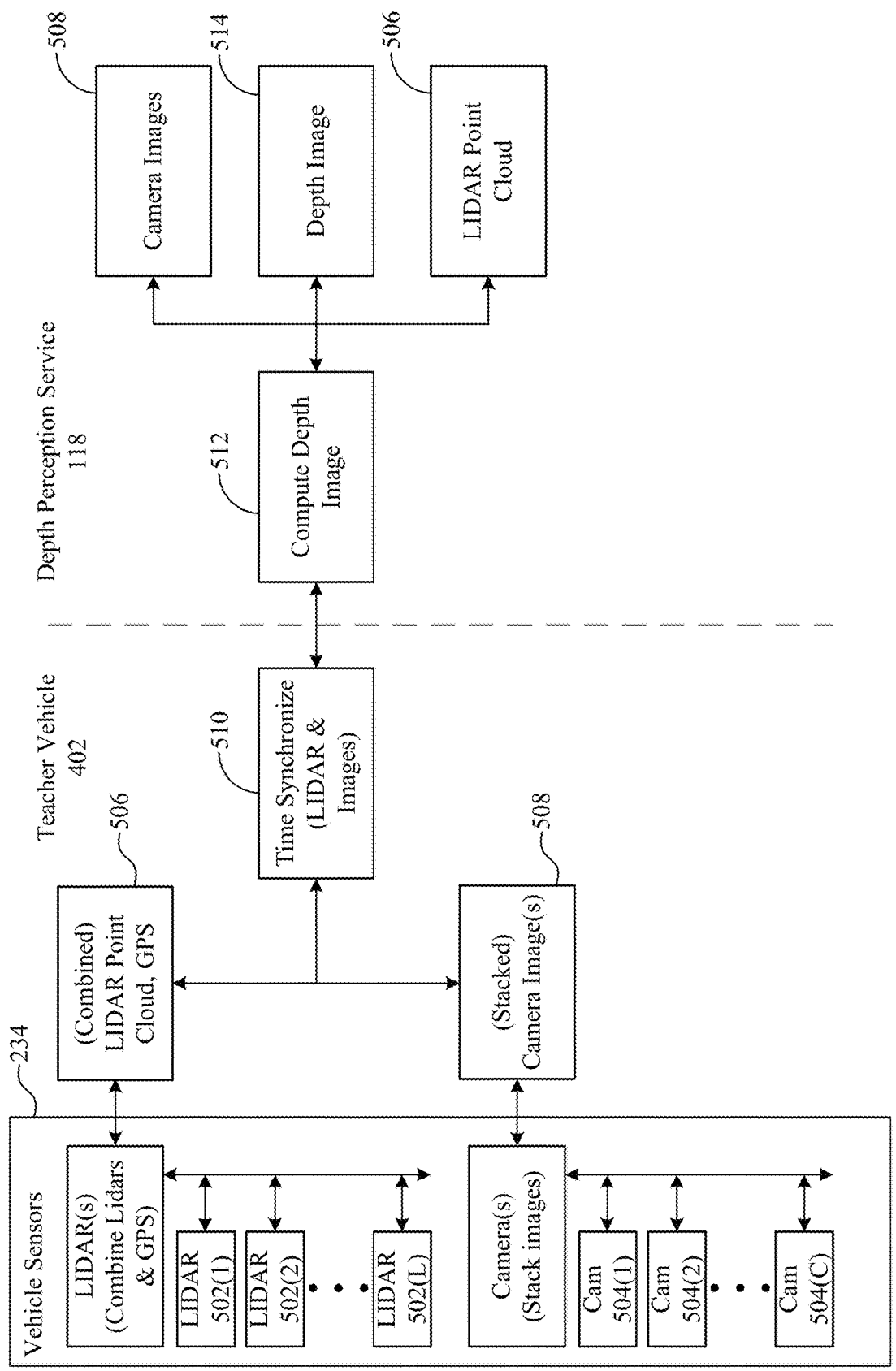
FIG. 5 is a block diagram showing data flow during data acquisition from a teacher vehicle.
Figure 9:
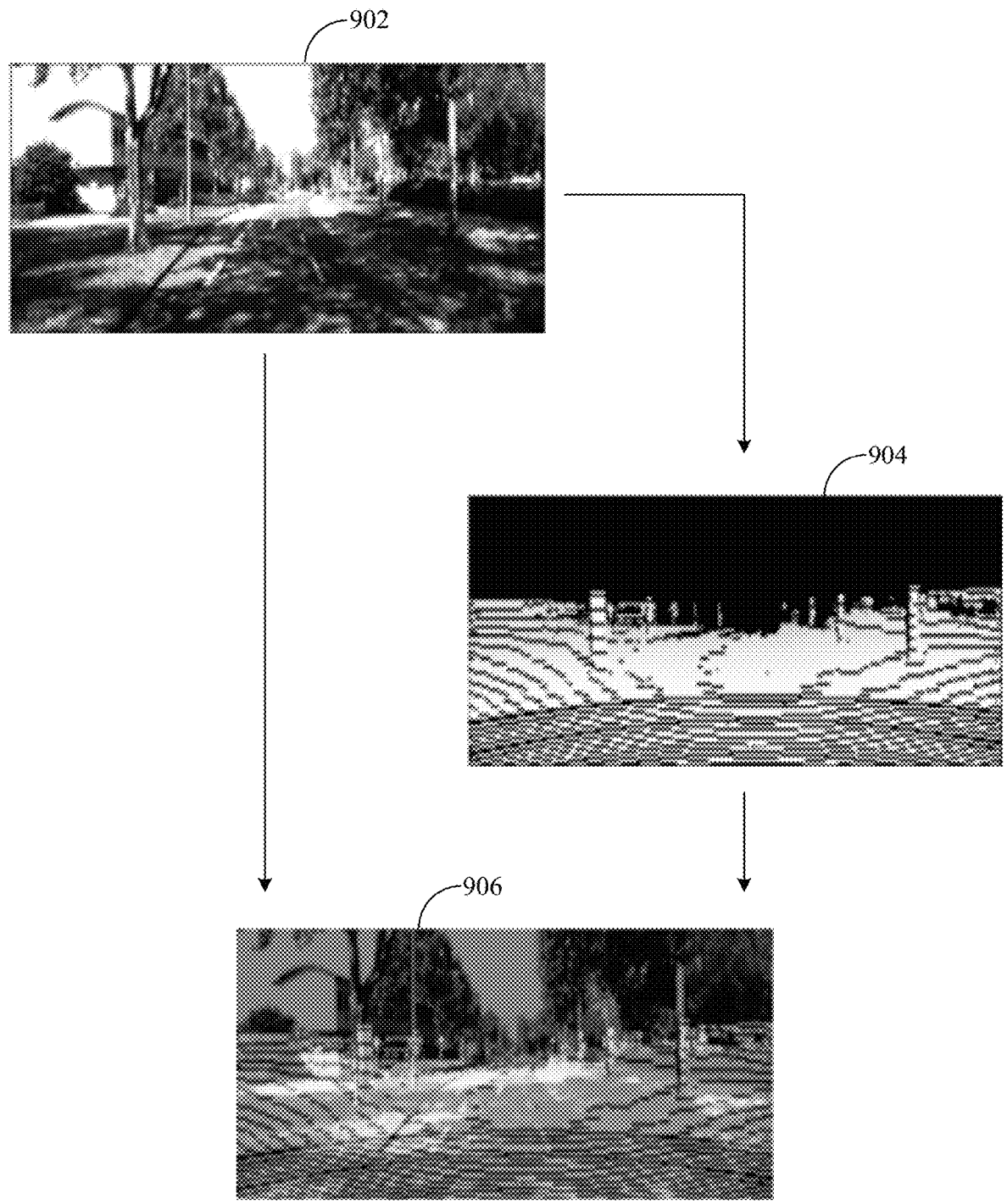
FIG. 9 is a block diagram showing an example depth prediction generated from an example input image.

FIG. 5 is a block diagram illustrating data flow between teacher vehicle 402 and depth perception training service 118 according to a particular example system. Vehicle sensors 222 include LiDAR sensors 502(1-L) and cameras 504(1-C). LiDAR sensors 502 are a type of active sensor that directly obtain 3D positions of objects (or sparsely for all regions in a scene). Output from each of LiDAR sensors 502 is combined, along with GPS data, to generate LiDAR point cloud 506. The LiDAR output is combined, for example, according to a spatial calibration of LiDAR sensors 502. Output from each of cameras 504 is combined into stacked camera image(s) 508. The camera output is combined, for example, according to a spatial calibration of cameras 504. LiDAR point cloud 506 and camera image(s) 508 are combined and time synchronized to form a time synchronized data set 510. The time synchronized LiDAR and image data 510 is provided to depth perception training service 118 for use in a process 512 of computing a depth image 514. Depth image 514 is a camera-image-size depth map in which the LiDAR point cloud is projected to the camera frame (as shown in FIG. 9). Depth image 514 is representative of the surroundings of autonomous vehicle 402 during a particular time interval.

Depth image 514 includes information indicative of the three dimensional positions of objects captured in camera images 508. Depth image 514 is utilized by depth perception training service 118 for training a machine learning framework (e.g., model 220) to detect object position and depth from a camera image alone (without LiDAR point cloud 506). The resulting framework is then utilized for multi-object tracking in the vicinity of autonomous vehicles 404 either in real-time (after the framework has been trained) for piloting autonomous vehicles 404 or at a later time for scenario extraction, actuarial reasons, etc. LiDAR point cloud 506, camera images 508, and depth image 514 are provided to the machine learning framework.

Figure 6:
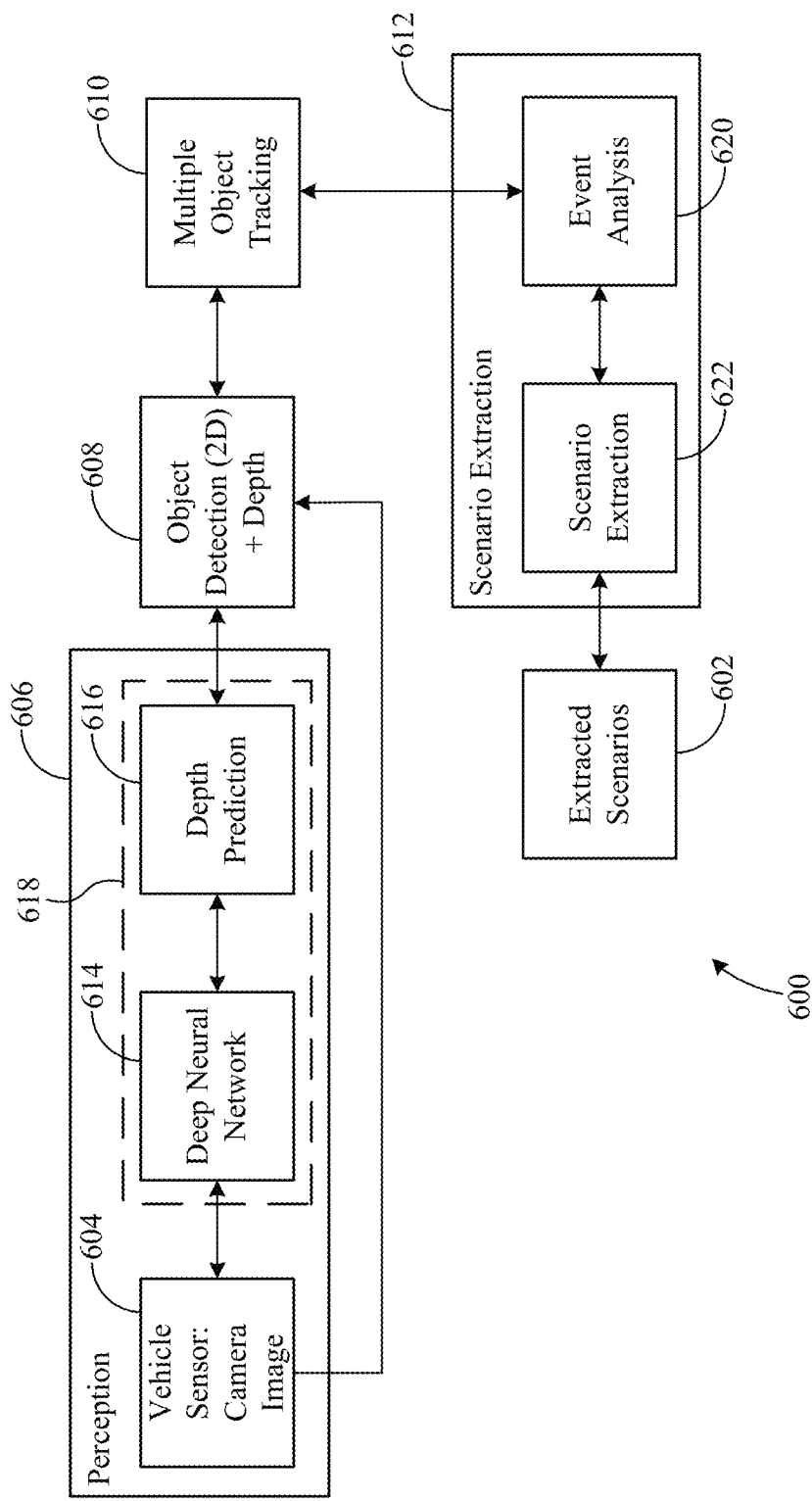
FIG. 6 is a block diagram showing a first example use case for the depth predictions generated by the depth perception model of FIG. 4.

FIG. 6 is a block diagram illustrating a method 600 for utilizing the trained machine learning framework (e.g., depth prediction model 220) for extracting driving scenarios

602 from a camera image 604 captured by a vehicle camera. It should be noted that the present application allows for the use of images captured by autonomous vehicles, non-autonomous vehicles, and even vehicles simply outfitted with a dash camera. In the example embodiment, camera image 604 is sourced from a database of video data captured by autonomous vehicles 102.

A perception stage 606 generates 3D object depth information from camera image 604 and provides the depth information to a 2D object detection and depth stage 608. Stage 608 detects the 2D positions of objects in camera image 604 and assigns the corresponding depth from perception stage 606 to each of the objects. The 3D positions of the objects are then provided to multi-object tracking stage 610. Multi-object tracking stage 610 tracks the movement of multiple objects in a scene over a particular time frame.

Multi-object tracking data is provided to a scenario extraction stage 612, by multi-object tracking stage 610. Scenario extraction stage 612 utilizes the object tracking information for event analysis and scenario extraction. In other words, method 600 utilizes input camera image(s) 604 to make determinations about what happened (e.g., lane changes, pedestrian actions, abrupt movements, and so on) around a vehicle during a particular time interval corresponding to image(s) 604. This facilitates the identification of relatively small portions of relevant data corresponding to predefined traffic scenarios within extremely large data sets of mostly irrelevant data.

Perception stage 606 includes a deep neural network 614, which provides a depth prediction 616 corresponding to image(s) 604. Deep neural network 614 and depth prediction 616 comprise a machine learning framework 618. Deep neural network 614 receives camera image(s) 604 and computes an encoded tensor representation of the input data. The encoded tensor is then utilized by 2D object detections & depths module 608 to determine the 3D positions of objects in image 604.

Scenario extraction stage 612 includes an event analysis module 620 and a scenario extraction module 622. Modules 620 and 622 utilize the multi-object tracking data to identify scenarios depicted by camera image(s) 604. The output of modules 620 and 622 is the extracted scenarios 602. Examples of extracted scenarios 602 include a vehicle changing lanes in front of the subject vehicle, a pedestrian crossing the road in front of the subject vehicle, a vehicle turning in front of the subject vehicle, etc. Extracted scenarios 602 are utilized for a number of purposes including, but not limited to, training autonomous vehicle piloting software, informing actuarial decisions, etc.

Figure 7:
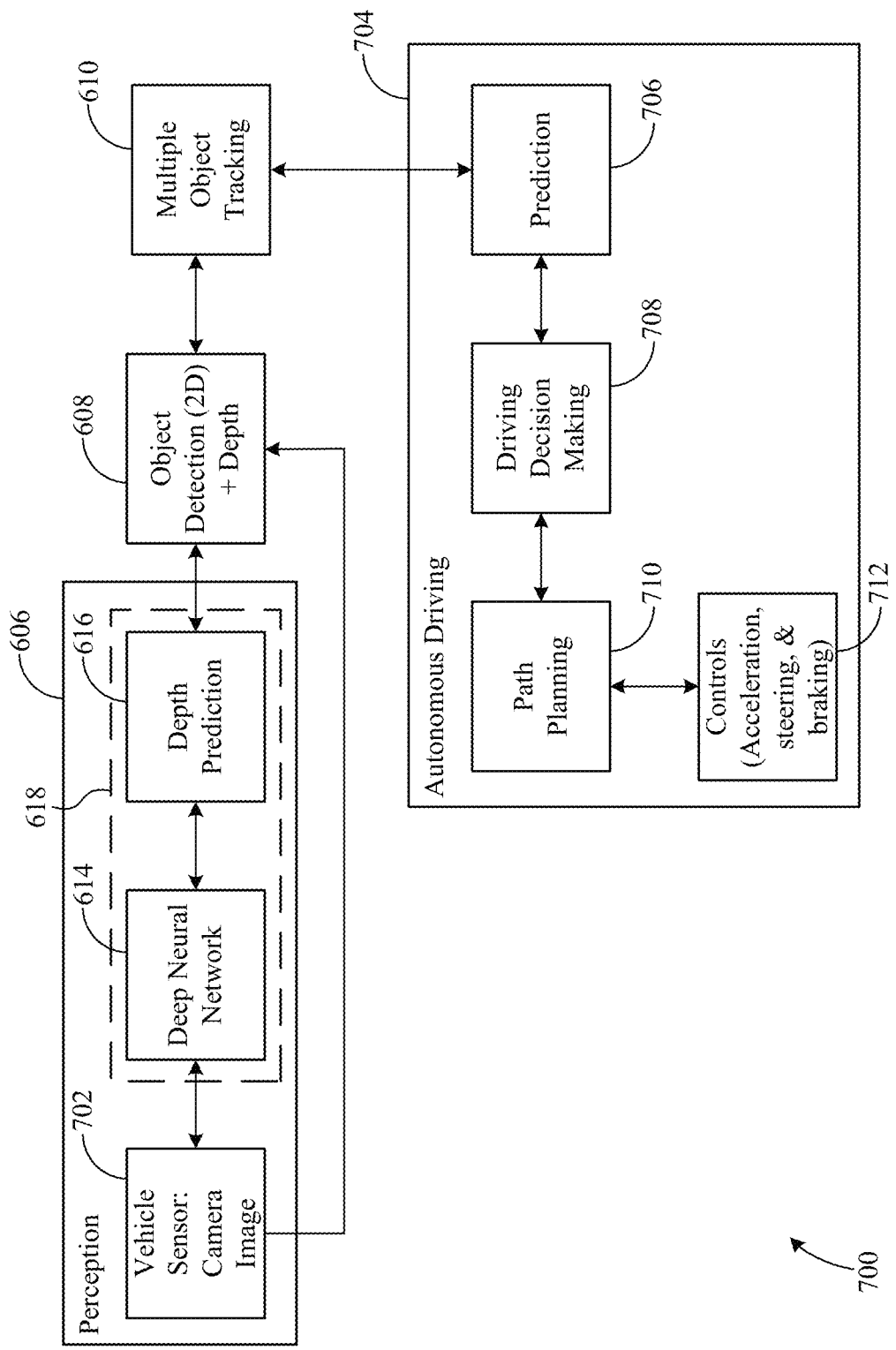
FIG. 7 is a block diagram showing a second example use case for the depth predictions generated by the depth perception model of FIG. 4.

FIG. 7 is a block diagram illustrating a method 700 for utilizing the trained machine learning framework for piloting an autonomous vehicle utilizing a camera image 702 captured by the autonomous vehicle in real-time.

Method 700 utilizes perception stage 606, object detection and depth stage 608, and multi-object tracking stage 610 of method 600, as well as an autonomous driving stage 704. Stages 606, 608, and 610 receive image 702 and generate multi-object tracking data in the same manner as in method 600. Autonomous driving stage 704 receives the multi-object tracking data and utilizes it to inform the controls of the autonomous vehicle that provided camera image 702.

Autonomous driving stage 704 includes a prediction module 706, a driving decision making module 708, a path planning module 710, and a controls module 712. Prediction module 706 utilizes the multi-object tracking data to predict the future positions and/or velocities of objects in the vicinity of the autonomous vehicle. For example, prediction module 706 may determine that a pedestrian is likely to walk in front of the autonomous vehicle based on the multi-object tracking data. The resultant prediction is utilized by driving decision making module 708, along with other information (e.g., the position and velocity of the autonomous vehicle), to make a decision regarding the appropriate action of the autonomous vehicle. In the example embodiment, the decision made at driving decision making module 708 may be to drive around the pedestrian, if the autonomous vehicle is not able to stop, for example. The decision is utilized by path planning module 710 to determine the appropriate path (e.g. future position and velocity) for the autonomous vehicle to take (e.g. from a current lane and into an adjacent lane). Control module 712 utilizes the determined path to inform the controls of the autonomous vehicle, including the acceleration, steering, and braking of the autonomous vehicle. In the example embodiment, the autonomous vehicle may steer into the adjacent lane while maintaining consistent speed.

It should be apparent, to those of ordinary skill in the art, that multi-object tracking and, therefore, information indicative of the 3D positions of objects in the vicinity of an autonomous vehicle is advantageous for piloting a vehicle safely. In prior art systems, LiDAR sensors are utilized to determine the 3D positions of these objects. However, the present invention makes it possible for an autonomous vehicle to be piloted without a LiDAR sensor, because machine learning framework 618 allows for the determination of the 3D positions of objects in the vicinity of an autonomous vehicle using only images captured by a 2D camera. This provides a significant advantage over the prior art, because LiDAR sensors are significantly more expensive than cameras. Additionally, LiDAR sensors require calibration with camera sensors, which represents an additional expense in utilizing LiDAR sensors with autonomous vehicles. This cost savings is realized in the initial manufacturing of autonomous vehicles and during periodic maintenance. Eliminating the need for LiDAR sensors additionally eliminates a potential point of failure for autonomous driving perception algorithms.

A number of the modules of FIGS. 6 and 7, including, but not limited to, scenario extraction module 622, path/motion planning module 710 and multiple object tracking module 610 do not always require complete 3D annotations (z, orientation, and length of the bounding box). The results of these modules can be achieved using just the 3D object positions (x, y, and z), because the orientations of moving objects can be obtained by retrospectively modeling the motion of the respective objects. Thus, the proposed method reduces full 3D annotation requirements to simply 2D and depth (z). The 2D annotations are inexpensive and readily available as opposed to exorbitantly priced and yet challenging LiDAR-based 3D annotations. FIGS. 8A-8D are data flow diagrams illustrating in greater detail the training of a student deep neural network using a trained teacher deep neural network. The training is accomplished in two stages. In a first stage 800A, shown in FIG. 8A, a teacher network 802 is trained with ground truth LiDAR supervision to make scaled depth predictions based on input images. In the example embodiment, teacher network 802 is a deep regression network for monocular depth estimation. However, any supervised depth prediction methods could be used, including any of those now known or yet to be invented. FIG. 8B illustrates backpropagation of the error/loss function of FIG. 8A for altering (i.e. training) teacher network 802. In a second stage 800B, shown in FIG. 8C, the learned weights of teacher network 802 are frozen, and the output of the frozen teacher network 802 is used, at least in part, to train a student network 804. The example student network 804 is a self-supervised, monocular depth estimation network with additional loss functions. In alternate embodiments, any self-supervised training methods can be used. FIG. 8D illustrates backpropagation of the error function of FIG. 8C for altering student network 804.

Figure 8A:
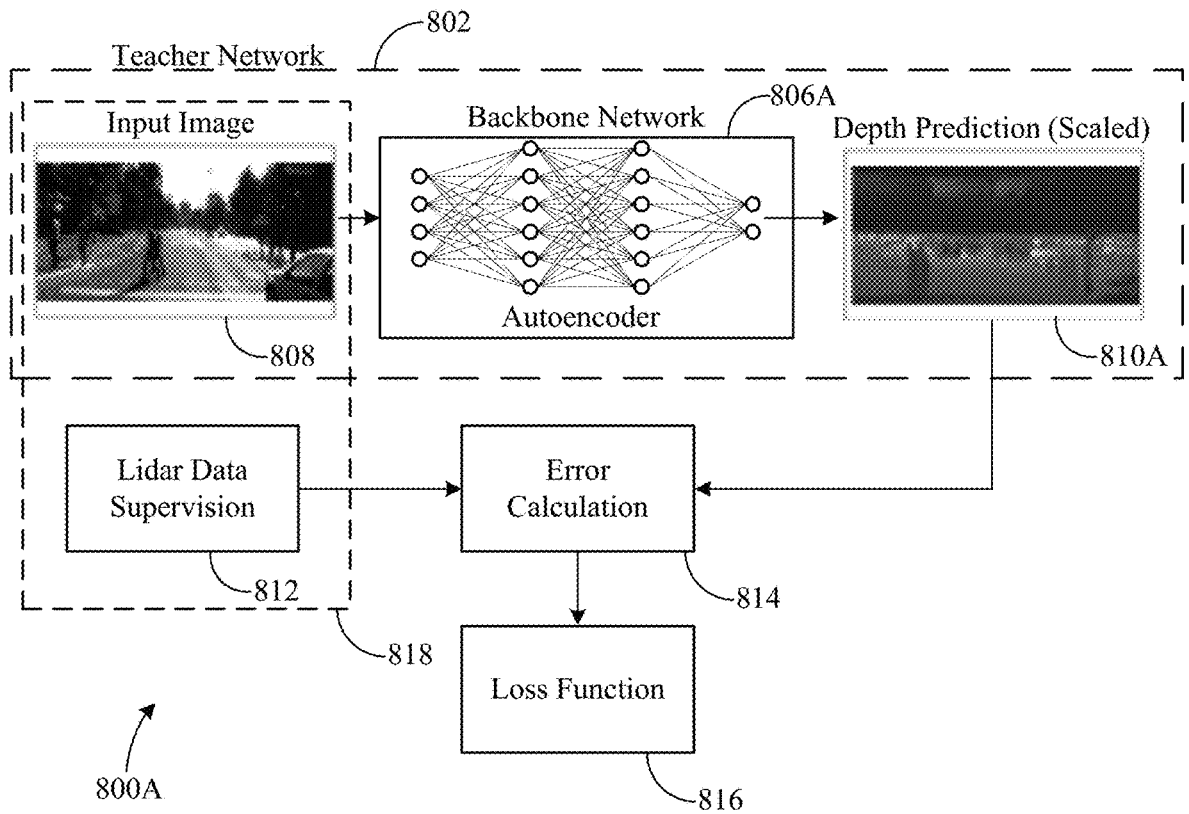
FIG. 8A is a block diagram showing data flow during a first stage of training a depth prediction network.
Figure 8B:
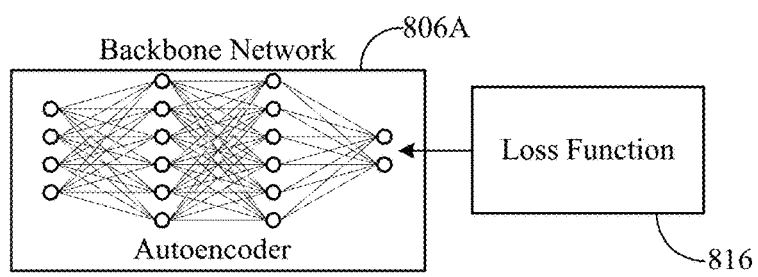
FIG. 8B is a block diagram showing data flow during backpropagation of the loss function of FIG. 8A.

FIG. 8A illustrates stage 800A. Network 802 includes a backbone network 806A based on Deep Layer Aggregation (e.g., DLA34) and having deformable convolutional layers. Backbone network 806A encodes an input image 808 into a depth prediction 810A. Network 806A is trained utilizing LiDAR data supervision 812, by minimizing a loss function between the predicted depth and the ground truth data. In order to do so, LiDAR data 812 and depth prediction 810A enter a comparison 814, which calculates loss function 816 using the two as inputs.

FIG. 8B shows loss function 816 being provided back into network 806A, where it is used to adjust the weights and biases in network 806 by, for example, minimizing the gradient of the loss function with respect to each weight and bias. In the example embodiment, the loss function is a softmax loss regression function, but other loss functions can be used.

Post-training, network 806A is capable of predicting scaled depth in an input image without ground truth supervision, if the camera configuration remains identical or almost identical. Image(s) 808 is/are a monocular camera image(s) captured by teacher vehicle 402 coincident with a corresponding portion of LiDAR data 812. Together, image 808 and LiDAR data 812 constitute training data 816. Training data 816 provides a representation of the scene that existed around vehicle 402 at a particular point in time when the corresponding image was captured.

Figure 8C:
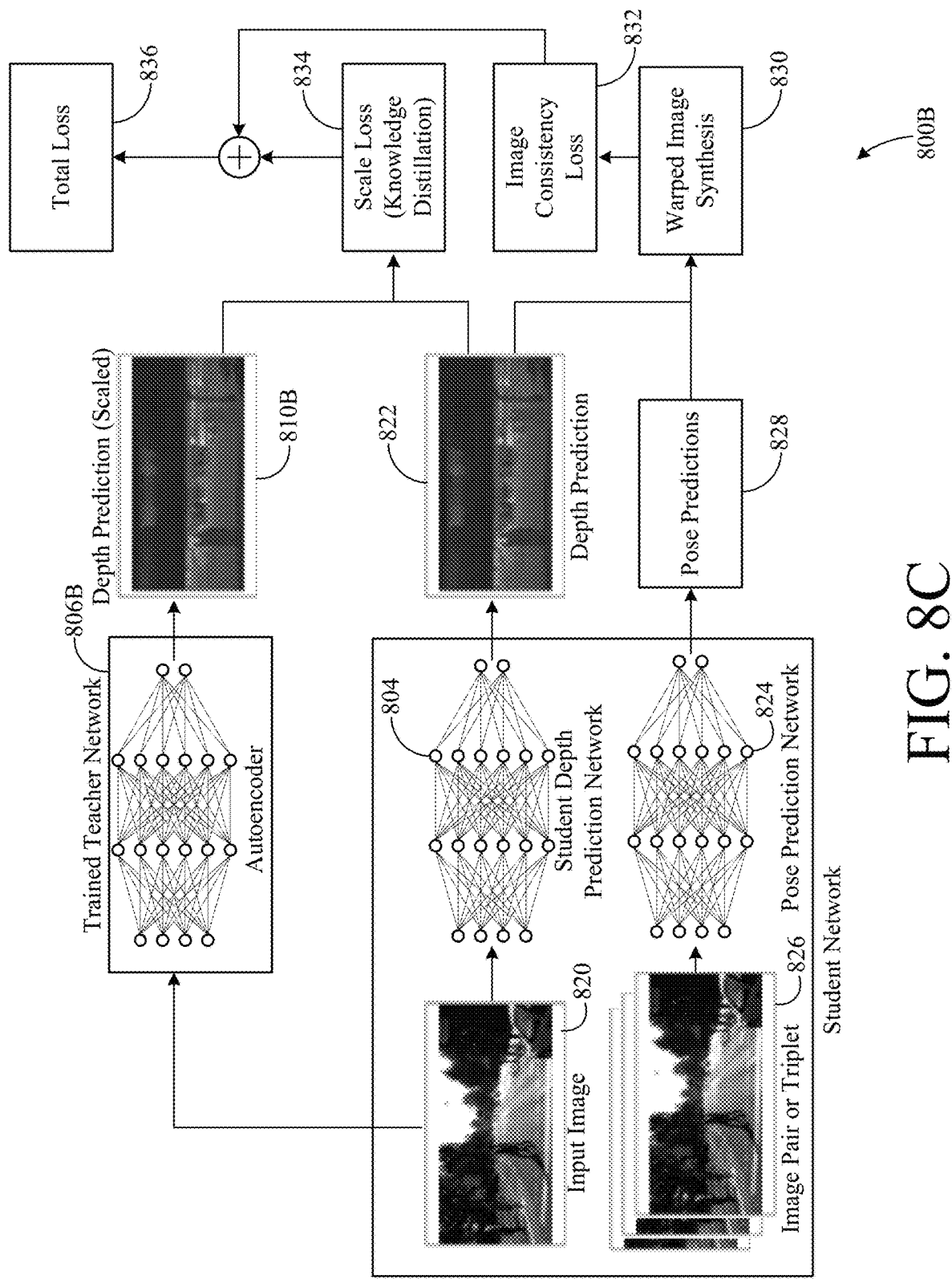
FIG. 8C is a block diagram showing data flow during a second stage of training a depth prediction network.
Figure 8D:
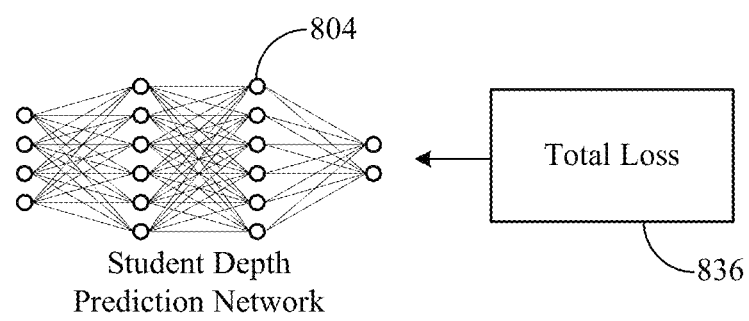
FIG. 8D is a block diagram showing backpropagation of the loss function of FIG. 8C.

FIG. 8C illustrates stage 800B, wherein the output of the frozen teacher network 802 is used, at least in part, to train student network 804. Student network 804 is a convolutional neural network that receives a monocular image 820 (or images) as an input and produces a depth prediction 822. Image 820 is encoded as an input tensor in (NCHW) format, where N is the number of frames, C is the number of channels (e.g., three color channels in an RGB image), H is the height of the image frame in pixels, and W is the width of the image frame in pixels. As an example, a single high definition, color image is encoded as a tensor with dimensions (1, 3, 1080, 1920). This format is provided as an example, and the exact format utilized could be different depending on the particular features and/or characteristics of the networks, cameras, input images, etc. Additionally, it may be desirable to perform some preprocessing (e.g., down-sampling, color correction, etc.) on the input image and/or the input tensor before input to network 804.

Depth prediction network 804 receives image(s) 820 and computes depth prediction 822 in a tensor format, as an illustrative example. As a more particular example, depth prediction 822 may be a tensor with dimensions (N, K, H/4, W/4), where K is 1. Thus, in this particular example, the depth prediction is spatially down-sampled compared to the input image, and the separate color channels are eliminated. As an alternative, depth prediction network 804 may spatially up-sample the input image, generate additional channels, etc. In the example, depth prediction network 804 is a deep layer aggregation network comprising a series of convolutional (or sparse/deformable convolutional) layers, and therefore, each layer of the network performs various computations and/or transformations on the input image before the final depth prediction is output. As a particular example, image(s) 820 could be spatially down-sampled while a plurality (e.g., tens, hundreds, thousands, etc.) of additional channels are generated, before the image(s) is up-sampled again by combining information from the previously generated channels into a single channel. Other possibilities for the transformation of input image 820 into depth prediction 822 exist and depend, at least in part, on the particular structure of network 804. Upon review of this disclosure, a person of ordinary skill in the art will understand how to design network 804 to meet the needs of a particular application.

Initially, depth prediction 822 is arbitrarily scaled; however, network 804 is trained to generate scaled depth predictions utilizing the outputs from teacher network 806B and a pose prediction network 824. Teacher network 806B is the trained version of backbone network 806A with all the weights and biases frozen (i.e. network 806B is no longer being trained/altered), and generates a scaled depth prediction 810B given an input image (e.g., image 820). Pose prediction network 824 is a convolutional neural network that receives a sequence 826 of monocular images (e.g. several frames of video data, including input image 820) as an input and produces pose predictions 828. Similar to network 806B, pose prediction network 824 is pre-trained and frozen for use in stage 800B. In the example embodiment, pose prediction network 824 is a convolutional neural network that is utilized for generating pose predictions from a sequence of images. However, in alternate embodiments, network 824 can be any self-supervised network that generates pose predictions, depth predictions, or some other image-based output from input image(s).

The output of depth prediction network 804 is compared to the outputs of both networks 806B and 824 (from the same or similar inputs) in order to train network 804 to predict scaled depth from a single monocular image. Depth prediction 822 is compared to both scaled depth prediction 810B and pose predictions 828. Depth prediction network 804 is then altered, based at least in part on this comparison, to "learn" to regress scaled depth predictions from monocular images.

In the example, the comparison between depth prediction 822, scaled depth prediction 810B, and pose predictions 828 occur in two steps. First, depth prediction 822 is compared to scaled depth prediction 810B and pose prediction 828, separately. Then, the two comparisons are combined.

A warped image synthesis 830 utilizes pose predictions 828 and depth prediction 822, separately, to recreate input image 820. The recreated images are then compared in order to calculate image consistency loss 832, which is a measure of the similarity of the recreated images. Image consistency loss 832 provides an indirect constraint on depth prediction 822, because an accurate depth prediction is required to generate an accurate recreated image. In the early stages of training, image consistency loss 832 may be relatively small, at least in part because depth prediction network 804 may be pre-trained in conjunction with pose prediction network 824.

The utilization of pose prediction network 824 is advantageous, because it allows the student network to learn the scaled depth prediction from the teacher network, while providing predictions that are consistent with the camera setup used for training. In other words, the student network learns to produce scaled depth estimates from a network trained on a first camera setup, without introducing distortions from training depth prediction on a different camera setup. This allows a single vehicle with a camera plus LiDAR setup to be utilized to train scaled, monocular depth estimation for a plurality of vehicles with varying camera setups and without LiDAR sensors.

The combined framework also compares depth predictions 810B and 822. This comparison allows scale knowledge to be distilled from network 806B to network 804, without the need to train network 804 with ground truth LIDAR data. Depth prediction 810B and 822 are compared to generate scale loss 834, which is simply a calculation of the difference between depth predictions 810B and 822 at each corresponding point. In the example embodiment, a pixel-wise, mean squared error function is utilized to calculate image consistency loss 832 and scale loss 834. In alternative embodiments, any applicable error function(s) can be utilized.

Image consistency loss 832 and scale loss 834 are combined by a weighted sum to generate a total loss function 836, which is a function of scaled depth prediction 810B, pose predictions 828, and the parameters of depth prediction network 804. In an example embodiment, image consistency loss 832 and scale loss 834 are weighted evenly to calculate total loss 836. However, in alternate embodiments, one of losses 832 or 834 could be weighted more heavily than the other. In addition, alternative formulas can be used to combine the losses, the formulas can be altered throughout training, etc., depending on the needs of the particular application.

FIG. 8D illustrates the backpropagation of total loss function 836 into student network 804. Total loss function 836 is the loss function utilized to train depth prediction network 804 through the shown backpropagation. For each forward pass (i.e., each time an image is analyzed by networks 804, 806B, and 824), total loss 836 is calculated for that forward pass. A backward pass of total loss 836 through student depth prediction network 84 is then completed for each corresponding forward pass. The backward pass calculates the gradient of total loss function 836 with respect to the parameters of each node in depth prediction network 804 and utilizes an optimization algorithm to identify the values of those parameters for which the total loss function 836 is minimized for the particular input image. In the example embodiment, a gradient descent algorithm is utilized for this optimization.

Because total loss function 836 is a function of the output of student depth prediction network 804, and the output of network 804 is a function of the values of the parameters of each node in the network, total loss function 836 is also a function of the values of the parameters of each node in the network. Therefore, the gradient of total loss function 836 can be calculated with respect to the values of the parameters of each node in network 804, and those parameters can be altered in order to minimize the value of the gradient. Thus, student depth prediction network 804 "learns" from the errors made in its output during each forward pass. By performing many forward and backward passes (e.g. thousands), during which depth prediction network 804 wrongly predicts the depths of the images and is corrected, network 804 eventually learns to predict the scaled depths accurately, without warping or otherwise altering the perspective of the image.

Student depth prediction network 804, in an example embodiment, is pre-trained alongside pose-prediction network 824 and has developed an ability to predict relative depths in images from a similar camera setup. Alternatively, network 804 could be initialized with random numbers as weights.

Optionally, depth confidence loss can also be calculated. To do so, confidence scores of the predicted depth (by the teacher network) are estimated using direct supervision (in the teacher network training itself) or using image consistency (already regressed by the student network). The confidence scores are utilized to determine which image regions have accurate depth. This loss ensures that the scale is not learned from regions of the depth map that are likely to be inaccurate. As another option, "layer-level" knowledge distillation loss, which ensures validity between the layers across networks 806B and 804, can be utilized.

FIG. 9 shows a depth image as generated by depth prediction network 804. FIG. 9 shows a raw camera image 902, which is utilized by network 804 to generate a depth image 904. Depth image 904 is overlaid on image 902 to generate an overlay image 906 for visualization.

This detailed description of the example embodiment(s) is by way of illustration and should not be construed as limiting in any way. For example, the student network can be any self-supervised depth prediction network trained only on camera data. The student network can then be optimized to run on the student vehicle processing system. Self-supervised depth prediction with only a camera, as explained above, is incapable of comprehending depth scale. Using teacher network outputs, the student network can "learn" the concept of depth scaling.

The teacher network can be any fully supervised depth prediction network trained with, for example, LiDAR (or any other ground truth supervision) and camera data. The teacher network can run on cloud/desktop processing systems or be optimized to run on teacher vehicle processing systems. These, and many other variations, will be apparent to those skilled in the art, in view of this disclosure.

We claim:

1. A method for training a machine learning framework to estimate the depths of objects captured in a two-dimensional image, said method comprising:
   providing a first trained machine learning network capable of determining three-dimensional (3-D) positions of target objects represented in two-dimensional (2-D) images of target spaces including said target objects;
   providing a second machine learning network, said second machine learning network being configured to provide an output responsive to receiving an input image;
   acquiring a 2-D image of objects in a space, said 2-D image including 2-D representations of said objects in said space;
   providing said 2-D image to said first trained machine learning network to generate an estimate of depths of said objects in said space;
   providing said 2-D image to said second machine learning network to generate an output corresponding to said 2-D image;
   comparing said estimate of said depths of said objects in said space with said output corresponding to said 2-D image; and
   altering said second machine learning network based at least in part on said comparison; and wherein
   said step of comparing includes generating a loss function indicative of differences between said estimate of depths of said objects in said space and said output, said loss function being a function of at least a portion of said second machine learning network;
   said step of altering said second machine learning network includes altering said second machine learning network to minimize said loss function;
   said second machine learning network includes a plurality of nodes, said loss function based at least in part on values associated with said nodes; and said step of altering said second machine learning network includes altering said values associated with said nodes.

2. The method of claim 1, wherein said step of altering said values associated with said nodes includes:
calculating a contribution of each of said nodes to said loss function; and
altering said values associated with each of said nodes in order to minimize said calculated contribution to said loss function.

3. The method of claim 1, wherein:
said estimate of said depths of said objects in said space includes information indicative of scale;
said output corresponding to said 2-D image is a second estimate of said depths of said objects in said space that includes initially inaccurate information indicative of said scale; and
said loss function is at least partially indicative of a loss of said information indicative of said scale between said estimate and said second estimate.

4. The method of claim 1, further comprising:
providing a third machine learning network configured to provide a second output responsive to receiving said input image;
providing said 2-D image to said third machine learning network to generate a second output corresponding to said 2-D image; and
comparing said output corresponding to said 2-D image with said second output corresponding to said 2-D image to generate a second comparison; and wherein said loss function is based at least in part on said second comparison.

5. The method of claim 4, wherein:
said first machine learning network is pre-trained utilizing images from a first camera setup; and
said third machine learning network is pre-trained utilizing images from a second camera setup, said second camera setup being different from said first camera setup.

6. The method of claim 5, wherein said 2-D image is captured from said second camera setup.

7. The method of claim 5, wherein:
said first camera setup is on a vehicle equipped with a ground truth sensor; and
said second camera setup is on a vehicle that is not equipped with a ground truth sensor.

8. The method of claim 7, wherein said first machine learning network is pre-trained utilizing said images of scenes from said first camera setup in combination with time-synchronized position information of said scenes captured by said ground truth sensor.

9. The method of claim 2, wherein:
said first machine learning network includes an additional plurality of nodes, said loss function being based at least in part on additional values associated with said additional plurality of said nodes; and
said additional values associated with said additional plurality of said nodes are not altered.

10. The method of claim 4, wherein said step of comparing said output corresponding to said 2-D image with said second output corresponding to said 2-D image to generate a second comparison includes:
generating a first recreation of said 2-D image based at least in part on said output corresponding to said 2-D image;
generating a second recreation of said 2-D image based at least in part on said second output corresponding to said 2-D image; and
determining an amount of image consistency loss between said first recreation of said 2-D image and said second recreation of said 2-D image.

11. A system for training a machine learning framework to estimate the depths of objects captured in a two-dimensional image, said system comprising:
at least one hardware processor electrically coupled to execute code, said code including a set of native instructions for causing said hardware processor to perform a corresponding set of operations responsive to executing said set of native instructions; and
memory for storing data and said code, said data and code including
a first trained machine learning network capable of determining three-dimensional (3-D) positions of target objects represented in two-dimensional (2-D) images of target spaces including said target objects,
a second machine learning network, said second machine learning network being configured to provide an output responsive to receiving an input image,
a 2-D image of objects in a space, said 2-D image including 2-D representations of said objects in said space,
a first subset of said set of native instructions configured to provide said 2-D image to said first trained machine learning network to generate an estimate of depths of said objects in said space,
a second subset of said set of native instructions configured to provide said 2-D image to said second machine learning network to generate an output corresponding to said 2-D image,
a third subset of said set of native instructions configured to compare said estimate of said depths of said objects in said space with said output corresponding to said 2-D image, and
a fourth subset of said set of native instructions configured to alter said second machine learning network based at least in part on said comparison; and wherein
said third subset of said set of native instructions is additionally configured to generate a loss function indicative of differences between said estimate of depths of said objects in said space and said output of said second machine learning network, said loss function being a function of at least a portion of said second machine learning network;
said fourth subset of said set of native instructions is additionally configured to alter said second machine learning network to minimize said loss function;
said second machine learning network includes a plurality of nodes, said loss function being based at least in part on values associated with said nodes; and
said fourth subset of said set of native instructions is additionally configured to alter said values associated with said nodes.

12. The system of claim 11, wherein said fourth subset of said set of native instructions is additionally configured to:
calculate a contribution of each of said nodes to said loss function; and
alter said values associated with each of said nodes in order to minimize said calculated contribution to said loss function.

13. The system of claim 11, wherein:
said estimate of said depths of said objects in said space includes information indicative of scale;
said output corresponding to said 2-D image is a second estimate of said depths of said objects in said space that includes initially inaccurate information indicative of said scale; and
said loss function is at least partially indicative of a loss of said information indicative of said scale between said estimate and said second estimate.

14. The system of claim 11, wherein said memory and said code additionally includes:
a third machine learning network configured to provide a second output responsive to receiving said input image; and
a fifth subset of said set of native instructions configured to provide said 2-D image to said third machine learning network to generate a second output corresponding to said 2-D image; and wherein
said third subset of said set of native instructions is additionally configured to compare said output corresponding to said 2-D image with said second output corresponding to said 2-D image to generate a second comparison; and
said loss function is based at least in part on said second comparison.

15. The system of claim 14, wherein:
said first machine learning network is pre-trained utilizing images from a first camera setup; and
said third machine learning network is pre-trained utilizing images from a second camera setup, said second camera setup being different from said first camera setup.

16. The system of claim 15, wherein said 2-D image is captured from said second camera setup.

17. The system of claim 15, wherein:
said first camera setup is on a vehicle equipped with a light detecting and ranging (LiDAR) sensor; and
said second camera setup is on a vehicle that is not equipped with a LiDAR sensor.

18. The system of claim 17, wherein said first machine learning network is pre-trained utilizing said images of scenes from said first camera setup in combination with time-synchronized position information captured by said LiDAR sensor and corresponding to said images.

19. The system of claim 12, wherein:
said first machine learning network includes an additional plurality of nodes, said loss function being based at least in part on additional values associated with said additional plurality of said nodes; and
said additional values associated with said additional plurality of said nodes are not altered.

20. The system of claim 14, wherein said third subset of said set of native instructions is additionally configured to:
generate a first recreation of said 2-D image based at least in part on said output corresponding to said 2-D image;
generate a second recreation of said 2-D image based at least in part on said second output corresponding to said 2-D image; and
determine an amount of image consistency loss between said first recreation of said 2-D image and said second recreation of said 2-D image, said amount of image consistency loss informing said second comparison.

21. A system for training a machine learning framework to estimate the depths of objects captured in a two-dimensional image, said system comprising:
a first trained machine learning network configured to analyze two-dimensional (2-D) images of target spaces including target objects and to provide output indicative of three-dimensional (3-D) positions of said target objects in said target spaces;
a second machine learning network, said second machine learning network configured to provide an output responsive to receiving a 2-D input image;
a comparator coupled to receive said output from said first trained machine learning network based on a particular 2-D image and to receive said output from said second machine learning network based on said particular 2-D image, said comparator operative to compare said output of said first trained machine learning network with said output of said second machine learning network; and
a feedback mechanism operative to alter said second machine learning network based at least in part on said output of said comparator; and wherein
said feedback mechanism is additionally configured to generate a loss function indicative of differences between said output of said first trained machine learning network and said output of said second machine learning network, said loss function being a function of at least a portion of said second machine learning network;
said feedback mechanism is additionally configured to alter said second machine learning network to minimize said loss function;
said second machine learning network includes a plurality of nodes, said loss function being based at least in part on values associated with said nodes; and
said feedback mechanism is additionally configured to alter said values associated with said nodes.

* * * * *